(12) United States Patent
Abuda et al.

(10) Patent No.: US 9,857,803 B1
(45) Date of Patent: Jan. 2, 2018

(54) WATER CONSERVATION SYSTEM

(71) Applicant: Water Dimmer, LLC, Portland, OR (US)

(72) Inventors: Daniel Abuda, Kennewick, WA (US); Karl Dahlgren, Portland, OR (US); Ken Varma, Richland, WA (US)

(*) Notice: Subject to any disclaimer, the term of this patent is extended or adjusted under 35 U.S.C. 154(b) by 0 days.

(21) Appl. No.: 15/423,123

(22) Filed: Feb. 2, 2017

(51) Int. Cl.
*G05D 7/06* (2006.01)

(52) U.S. Cl.
CPC .................. *G05D 7/0676* (2013.01)

(58) Field of Classification Search
CPC ........... G05D 7/0676; Y10T 137/7761; Y10T 137/1963; Y10T 137/1987
USPC ......................... 137/487.5, 79, 80
See application file for complete search history.

(56) References Cited

U.S. PATENT DOCUMENTS

| | | | |
|---|---|---|---|
| 3,135,282 A | 6/1964 | Gray | |
| 4,914,758 A | 4/1990 | Shaw | |
| 5,056,554 A * | 10/1991 | White | E03B 7/12 137/487.5 |
| 5,139,044 A * | 8/1992 | Otten | A01G 25/16 137/80 |
| 5,175,892 A | 1/1993 | Shaw | |
| 5,190,068 A * | 3/1993 | Philbin | G05D 7/06 137/487.5 |
| 5,464,327 A | 11/1995 | Horwitz | |
| 5,738,495 A | 4/1998 | Carmignani et al. | |
| 6,441,744 B1 * | 8/2002 | Adams | G05D 16/2093 137/551 |
| 6,446,875 B1 | 9/2002 | Brooks et al. | |
| 6,543,479 B2 | 4/2003 | Coffey et al. | |
| 6,763,845 B2 * | 7/2004 | Hoggard | E03B 7/10 137/80 |
| 7,030,767 B2 * | 4/2006 | Candela | E03B 7/071 137/79 |
| 8,201,572 B2 | 6/2012 | Segal | |
| 8,393,352 B2 | 3/2013 | Porter-Coote | |
| 8,640,724 B2 | 2/2014 | Izutani et al. | |
| 8,783,027 B2 * | 7/2014 | Snuttjer | G05D 16/2013 137/487.5 |
| 8,905,062 B2 | 12/2014 | Menet | |
| 8,939,016 B2 | 1/2015 | Brasel et al. | |

(Continued)

FOREIGN PATENT DOCUMENTS

CN 203546825 U 4/2014

*Primary Examiner* — Eric Keasel
(74) *Attorney, Agent, or Firm* — Patentfile, LLC; Bradley C. Fach; Steven R. Kick

(57) ABSTRACT

In some embodiments, a water conservation system may include a main conduit which may be in fluid communication with a bypass conduit via a bypass inlet and a bypass outlet. An inlet isolation valve, a flow control valve, and an outlet isolation valve may be coupled in series on the main conduit. A pressure sensor may be coupled to the main conduit before the bypass conduit inlet and a flow meter may be coupled to the main conduit after the bypass conduit outlet. A processing unit may be in communication with an ambient temperature sensor and also in communication with the flow control valve, the pressure sensor, and the flow meter. The processing unit may operate the flow control valve to provide an unlimited range of programmable rates of water flows that can be achieved automatically and remotely for optimal supply in the facility in which the system is installed.

14 Claims, 5 Drawing Sheets

(56) References Cited

U.S. PATENT DOCUMENTS

| | | |
|---|---|---|
| 9,494,480 B2 | 11/2016 | Klicpera |
| 2003/0126295 A1 | 7/2003 | Doherty |
| 2011/0114202 A1 | 5/2011 | Goseco |
| 2012/0291886 A1 | 11/2012 | Rivera |
| 2014/0026644 A1 | 1/2014 | Patel et al. |
| 2014/0230925 A1 | 8/2014 | Halimi |
| 2015/0075655 A1 | 3/2015 | Olguin et al. |

\* cited by examiner

WATER CONSERVATION SYSTEM

FIELD OF THE INVENTION

This patent specification relates to the field of hydraulic engineering systems, which may be used for water conservation and real time monitoring, regulating, diagnosing and troubleshooting. More specifically, this patent specification relates to systems and methods that are configured for controlling and conserving water during distribution such as in residential, industrial and commercial facilities.

BACKGROUND

The shortage of water for residential, industrial and commercial use has generated a need for different technical mechanisms for minimizing the environmental impact. The shortage of the scarcely available water has forced many manufacturers to offer devices, systems and accessories for an efficient use of water, using the renewed infrastructure with innovations to minimize impact by reducing the over consumption of water used traditionally. Nevertheless, the utilization of water-saving devices with the use of flow monitoring and control devices are not currently addressed in the state of the art systems available in the market place.

Therefore a need exists for a novel water conservation system for automatically monitoring water flow, pressure and temperature, and for detecting, preventing and eliminating leaks. There is also a need for a novel water conservation system which is configured to develop savings and water efficiency in water distribution system or devices connected to the main line entering the given facility. Still another need exists for a novel water conservation system which allow for an unlimited range of programmable rates of water flows that can be achieved automatically and remotely for optimal supply in the facilities where the system is installed. A further need exists, for a novel water conservation system which enables the conservation of water by reducing water pressure in facilities which require continuous consumption of water from currently scarcely available and overburdened resources. Finally, a need exists for a novel water conservation system that is self learning and self programmable to obtain an unlimited and desired range of supply of water flow.

BRIEF SUMMARY OF THE INVENTION

A water conservation system for use with any fluid is provided. In some embodiments, the system may be configured to automatically monitor water flow, pressure and temperature, which may be used for detecting, preventing and eliminating leaks in the water supply infrastructure of the facility which is in fluid communication with the system and the supply conduit. In further embodiments, the system provides for an unlimited range of programmable rates of water flows, via one or more flow control valves that can be achieved automatically and remotely for optimal supply in the facility in which the system is installed.

In some embodiments, the system may include a main conduit which may be in fluid communication with a fluid inlet and a fluid outlet. The main conduit may be in fluid communication with a bypass conduit via a bypass inlet and a bypass outlet. An inlet isolation valve, a flow control valve, and an outlet isolation valve may be coupled in series on the main conduit with the inlet isolation valve relatively closer to the fluid inlet and the outlet isolation valve relatively closer to the fluid outlet. The bypass conduit may have a bypass valve and may be coupled to the main conduit so that when the bypass valve is open, fluid is able to bypass portions of the main conduit having the inlet isolation valve, flow control valve, and outlet isolation valve via the bypass conduit. A pressure sensor may be coupled to the main conduit before the bypass conduit inlet and a flow meter may be coupled to the main conduit after the bypass conduit outlet. A processing unit may be in communication with an ambient temperature sensor and also in communication with the flow control valve, the pressure sensor, and the flow meter.

In further embodiments, the processing unit may include software for controlling and receiving information from one or more pressure sensors, flow control valves, temperature sensors, and flow meters. Additionally, the programs may include one or more temperature, pressure, and flow rate thresholds of a pressure sensor, flow control valve, other automated valves, temperature sensor, and flow meter, thereby enabling the programs of the processing unit to automatically monitor the temperature, pressure, and the flow rate of the water flow through the system.

In still further embodiments, the system may comprise a control device which may be in wired and/or wireless electronic communication with the processing unit. Preferably, a user may use a control device to interact with the processing unit of the system, thereby allowing the user to control or receive information from one or more elements of the system which are in electronic communication with the processing unit such as an ambient temperature sensor, a flow control valve, any other automated valves, a flow meter, and/or a pressure sensor.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
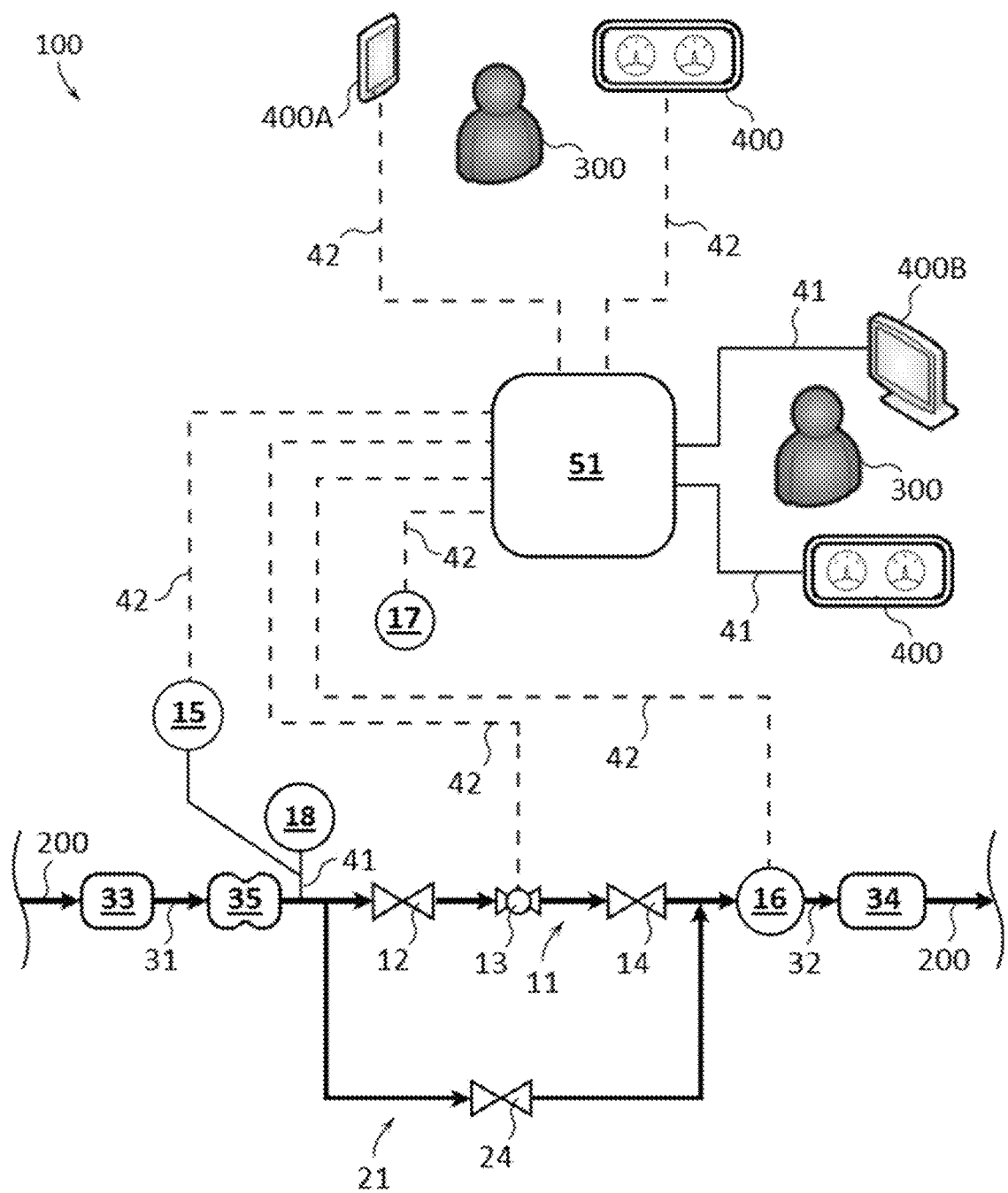
FIG. 1 depicts a block diagram of some of the components of an example of a water conservation system according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

New hydraulic engineering systems are discussed herein. While in some embodiments, the system may be used with water, it should be understood that in other embodiments, the system may be used with any type of fluid, such as gasses and liquids. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 2:
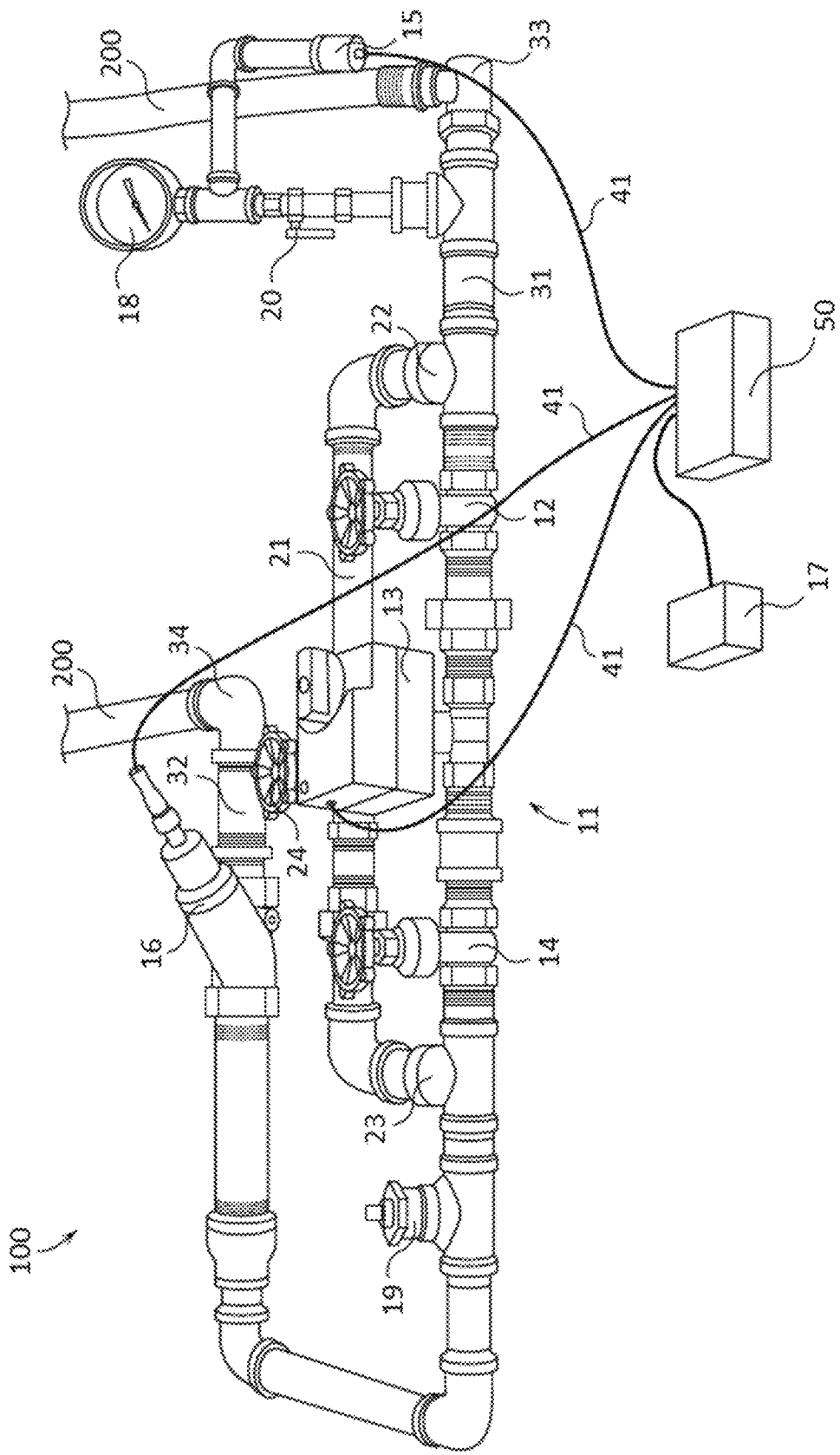
FIG. 2 illustrates a bottom perspective view of an example of a water conservation system according to various embodiments described herein.
Figure 3:
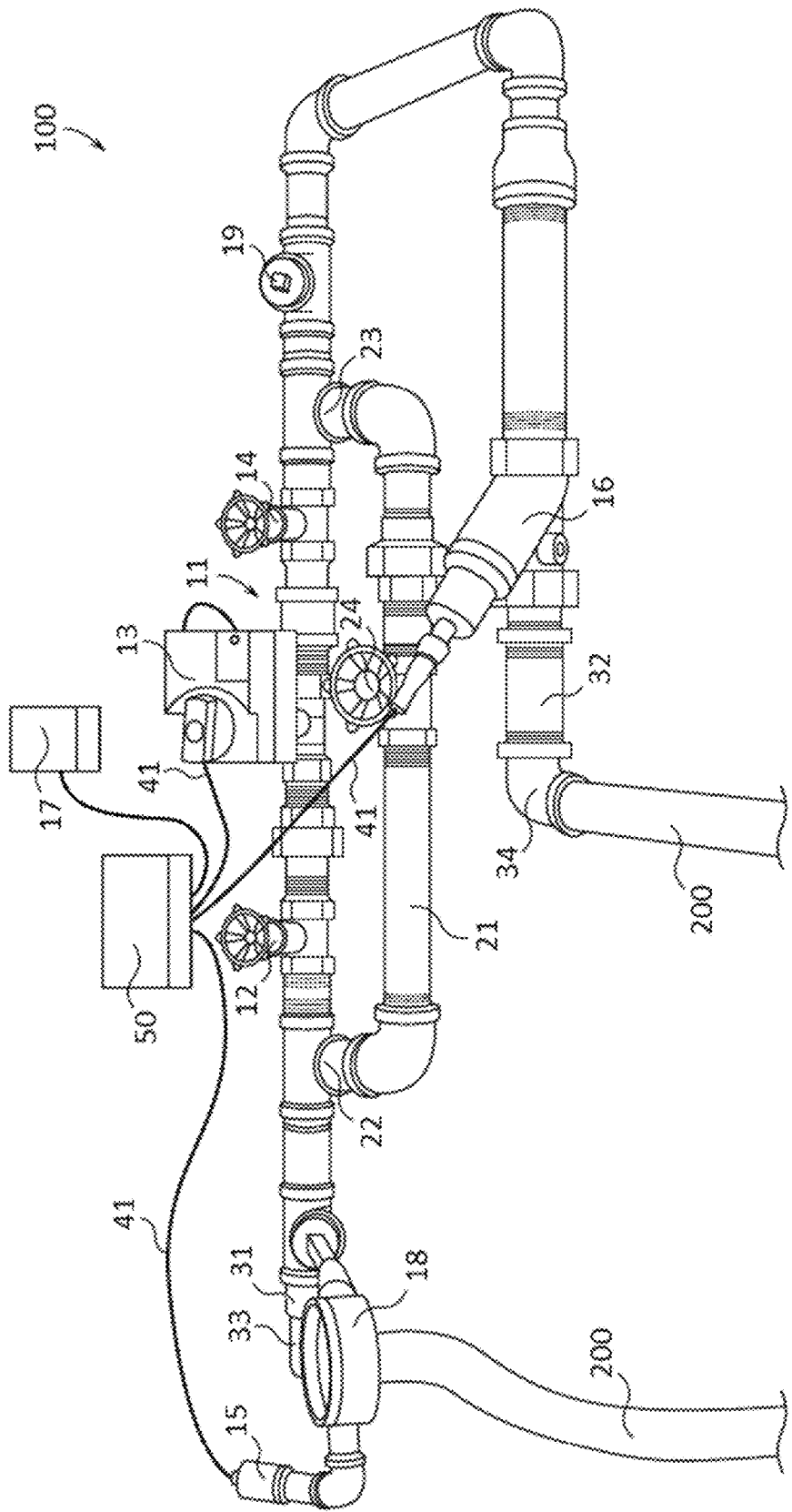
FIG. 3 shows a top perspective view of an example of a water conservation system according to various embodiments described herein.

The present invention will now be described by example and through referencing the appended figures representing preferred and alternative embodiments. FIGS. 1-3 illustrate an example of a water conservation system ("the system") 100 according to various embodiments. In this and some embodiments, the system 100 may comprise a main conduit 11 which may be in fluid communication with a fluid inlet 31 and a fluid outlet 32. The main conduit 11 may be in fluid communication with a bypass conduit 21 via a bypass inlet 22 and a bypass outlet 23. An inlet isolation valve 12, a flow control valve 13, and an outlet isolation valve 14 may be coupled in series on the main conduit 11 with the inlet isolation valve 12 relatively closer to the fluid inlet 31 and the outlet isolation valve 14 relatively closer to the fluid outlet 32. The bypass conduit 21 may have a bypass valve 24 and may be coupled to the main conduit 11 so that when the bypass valve 24 is open, fluid is able to bypass portions of the main conduit 11, having the inlet isolation valve 12, flow control valve 13, and outlet isolation valve 14 via the bypass conduit 21. A pressure sensor 15 may be coupled to the main conduit 11 before the bypass inlet 22 and a flow meter 16 may be coupled to the main conduit 11 after the bypass conduit outlet 23. A processing unit 50 may be in communication with an ambient temperature sensor 17 and also in communication with the flow control valve 13, the pressure sensor 15, and the flow meter 16.

In some embodiments, the system 100 may be configured to enable the conservation of water by reducing water pressure, hence water flow, in facilities which require continuous consumption of water from currently scarcely available and overburdened resources. The system 100 may be installed or coupled to a pipe or supply conduit 200, which supplies water to the facility, via an inlet coupling 33 and an outlet coupling 34. The inlet coupling 33 may also be coupled to the fluid inlet 31 of the system 100 thereby allowing water from the supply conduit 200 to enter the system 100, and the outlet coupling 34 may also be coupled to the fluid outlet 32 of the system 100 thereby allowing water from the supply conduit 200 to exit the system 100 into the supply conduit 200. In this manner, water flowing through the supply conduit 200 must pass through the system 100.

In some embodiments, the system 100 may be installed on a supply conduit 200 by a user 300 that may isolate and drain one or more existing water supply lines of the supply conduit 200. The user 300 may then cut into the existing supply conduit 200 and use the inlet coupling 33 and outlet coupling 34 to connect the system 100 to the water supply conduit 200. Once the supply conduit 200 connection is established, the water supply to the system 100 is established, power may be supplied to the system 100, and the processing unit 50 may be booted up and placed in operation. The programs 59 or software may be started up and connection or the I/O interfaces 52 to the processing unit 50 may be confirmed. The user 300 then configures the system 100 to meet his needs based on a menu of options provided with an application program 59 via a control device 400 in wired electronic communication 41 and/or wireless electronic communication 42 with the processing unit 50. Once these options are selected, the processing unit 51 runs continuously and provides data from the I/O interfaces requested or on a scheduled or on-demand basis and automatically responds to any requirements that the user has selected for the conservation of water. The processing unit 50 may also provide data to an auto-learning algorithm which may provide recommendations to the user 300 to optimize water conservation based on requirements provided by the user 300. The user 300 may also be provided with configurable settings to implement the recommended optimization parameters. While water is frequently referenced, the system 100 may be used for any fluid where there is any specific incentives to conserve fluid consumption for economic, environmental impact, or safety reasons.

In some embodiments, an inlet coupling 33 and an outlet coupling 34 may comprise any suitable conduit connection method. For example, an inlet coupling 33 and/or an outlet coupling 34 may comprise: any type of adapter which is commonly used to extend runs, or to simply change the connection type at the end of a pipe; any type of bushing which is commonly used to join pipes of different sizes, usually by reducing a larger fitting down to a smaller pipe; any type of coupling which may be used to extend the run of a pipe, or change pipe sizes (in the case of a reducing coupling, also sometimes called a "bell" reducer due to its shape and which are commonly available with female threads, or unthreaded for either plastic gluing (solvent welding) or copper soldering, these are among the most-used of fittings; any type of elbow which is commonly used to change the direction of flow; any type of flange which is commonly used to connect pipes by threading or welding the pipe to the flanges which are then sealed together (usually with bolts); any type of nipple which is a short stub of pipe, male-threaded at each end, that are used to connect straight pipe runs; and any other type of coupling or connector. In still further embodiments, an inlet coupling 33 and/or an outlet coupling 34 may comprise welding, heat bonding, chemical bonding, or the like.

In some embodiments, the system 100 may comprise one or more fluid modification provisions 35 which may be positioned anywhere on a main conduit 11, bypass conduit 21, and/or supply conduit 200. Preferably, a fluid modification provision 35 may be located after the water meter of the facility, such as after the inlet coupling 33 on the fluid inlet 31. Generally, a fluid modification provision 35 may comprise a removably coupled section of pipe or conduit that may be replaced with or coupled to a fluid modification device such as a commercially available water filter, water softener, water sanitizer, water heater, water cooler, salt dispenser, or other device that is capable of modifying liquid passing through the system 100. In some embodiments, a fluid modification provision 35 may comprise one or more lengths or sections of pipe or conduit which are flanked or surrounded by one or more removable couplings. Once one or more sections of pipe or conduit and/or removable couplings are removed from a fluid modification provision 35, one or more fluid modification devices may be installed or coupled to one or more other sections of pipe or conduit of the fluid modification provision 35, other removable couplings of the fluid modification provision 35, and/or other component or element of the system 100 such as to the fluid inlet 31. Alternatively, once a fluid modification provision 35 is removed from the system 100, one or more fluid modification devices may be installed or coupled to the system 100 in its place.

The water or fluid conducting ability of the main conduit 11, bypass conduit 21, bypass inlet 22, bypass outlet 23, fluid inlet 31, and/or fluid outlet 32 may be provided by forming one or more of these elements from any type of pipe or conduit, such as Poly Vinyl Chloride (PVC) pipe and fittings, Chlorinated Poly Vinyl Chloride (CPVC) pipe and fittings, cross-linked polyethylene (PEX) pipe and fittings, galvanized pipe and fittings, black pipe and fittings, polyethylene pipe and fittings, copper pipe and fittings, brass pipe and fittings, stainless steel or other steel alloy pipe and fittings, vinyl pipe and fittings, or any other type of pipe or conduit.

In some embodiments, the system 100 may comprise one or more pressure sensors 15 which may be positioned before and/or after the flow control valve 13 in the system 100, such as proximate to the fluid inlet 31, which may be positioned anywhere in the system 100, such as proximate to the fluid inlet 31 and/or at a provision for an outlet pressure sensor coupling location 19, which may be used to detect the water pressure at the point or position in the system 100 where the pressure sensor 15 is installed or coupled. Each pressure sensor 15 may be in wired electronic communication 41 (FIGS. 2 and 3) and/or wireless electronic communication 42 (FIG. 1) with the processing unit 50. A pressure sensor 15 may include silicon MEMS strain gauge sensors; pressure sensor piezoresistive silicon pressure sensors; analog output pressure transducer sensors; remote wireless pressure transducers; harsh media pressure sensors; digital output absolute pressure sensors; IsoSensor type pressure sensors; solid state pressure sensors; or any other type of pressure sensing method or device.

In some embodiments, the system 100 may comprise one or more pressure gauges 18 which may be positioned anywhere in the system 100, such as proximate to the fluid inlet 31, and which may be configured to provide a visual reading of the water pressure at the point or position in the system 100 where the pressure gauge 18 is installed or coupled. A pressure gauge 18 may comprise any available digital and/or analogue type pressure gauge which may provide visual information to an observing user 300 or individual.

In some embodiments, the system 100 may comprise one or more flow meters 16 which may be positioned anywhere in the system 100 and which may be or comprise any type of flow sensor. Each flow meter 16 may be configured to measure the speed or flow rate of water moving at the point or position in the system 100 where the flow meter 16 is installed or coupled. Each flow meter 16 may be in wired electronic communication 41 (FIGS. 2 and 3) and/or wireless electronic communication 42 (FIG. 1) with the processing unit 50. In some embodiments, a flow meter 16 may comprise a turbine flow meter which may measure the speed of water by measuring the speed at which the water rotates a turbine positioned in the water. In other embodiments, a flow meter 16 may comprise a differential pressure flow meter, an orifice plate flow meter, a venture tube flow meter, a flow nozzle flow meter, a variable area flow meter or rotameter, a velocity flow meter, a pilot tube flow meter, a calorimetric flow meter, a vortex flow meter, an electromagnetic flow meter, an ultrasonic Doppler flow meter, a positive displacement flow meter, a mass flow meter, a thermal flow meter, a Coriolis flow meter, an open channel flow meter, or any other suitable device which is able to measure the flow rate of water and communicate this data to a processing unit 50.

In some embodiments, the system 100 may comprise one or more temperature sensors 17 which may be positioned anywhere in the system 100. Each temperature sensor 17 may be in wired electronic communication 41 (FIGS. 2 and 3) and/or wireless electronic communication 42 (FIG. 1) with the processing unit 50. In further embodiments, a temperature sensor 17 may be positioned proximate to the system 100 or an element of the system 100 and the temperature sensor 17 may provide ambient air temperature information to the processing unit 50. In still further embodiments, a temperature sensor 17 may be positioned anywhere in the system 100 and may provide temperature information describing the water temperature or system component temperature at the point or position in the system 100 where the temperature sensor 17 is installed or coupled. A temperature sensor 17 may comprise a thermocouple, a resistive temperature device (RTDs, thermistors), an infrared temperature sensor, a bimetallic device, a liquid expansion device, a molecular change-of-state device, a silicon diode, or any other type of temperature sensor configured to electrically communicate temperature information.

In some embodiments, the system 100 may comprise one or more valves such as a and inlet isolation valve 12, a flow control valve 13, an outlet isolation valve 14, a pressure gauge shutoff valve 20, and/or a bypass valve 24. These valves 12, 13, 14, 20, 24, may enable, disable, or otherwise modulate the flow of water to or through one or more elements or components of the system 100 and may comprise or include a ball valve, a gate valve, butterfly valve, diaphragm valve, globe valve, check valve, pressure balanced valve, locking valve, solenoid valve, or any other type of valve or controller which may be used to enable, disable, or otherwise modulate the flow of water to or through one or more elements or components of the system 100. In some embodiments, one or more of these valves 12, 13, 14, 20, 24, may be a manually operated valve so that the valve may be manually opened or closed by a user 300. In further embodiments, one or more of these valves 12, 13, 14, 20, 24, may be an automated valve so that the valve may be opened or closed without physical interaction of a user 300 with the valve.

In some embodiments, an inlet isolation valve 12 may be positioned between a bypass inlet 22 and a flow control valve 13. When the inlet isolation valve 12 is closed fluid may be prevented from traversing portions of the main conduit 11 and optionally directed to or through the bypass conduit 21. When the inlet isolation valve 12 is open fluid may be enabled to traverse the main conduit 11 through the inlet isolation valve 12.

In some embodiments, a flow control valve 13 may be positioned between an inlet isolation valve 12 and an outlet isolation valve 14, thereby allowing the inlet isolation valve 12 and outlet isolation valve 14 to provide a means to isolate the flow control valve 13 for maintenance or other purposes. Preferably, a flow control valve 13 may be an automated valve which may be remotely operated by the processing unit 50 and may be in wired electronic communication 41 and/or wireless electronic communication 42 with the processing unit 50. The processing unit 50 may control the water pressure in the main conduit 11 by operating the flow control valve 13. Opening or increasing the opening of the flow control valve 13 may provide or increase water pressure in the main conduit 11, while closing or decreasing the opening of the flow control valve 13 may cease or decrease water pressure in the main conduit 11. Examples of automated valves which may be used as flow control valves 13 include electronic automatic valves, such as motorized valves and solenoid operated valves, hydraulically operated valves, and electronic with hydraulic back-up valves. In preferred embodiments, the flow control valve 13 may be operated by the processing unit 50 to control or modulate the amount of fluid which may pass through the flow control valve 13 thereby controlling the pressure and or flow of fluid through portions of the main conduit. When the flow control valve 13 is closed fluid may be prevented from traversing portions of the main conduit 11 and optionally directed to or through the bypass conduit 21. When the flow control valve 13 is open fluid may be enabled to traverse the main conduit 11 through the flow control valve 13.

In some embodiments, an outlet isolation valve 14 may be positioned between a bypass outlet 23 and a flow control valve 13. When the outlet isolation valve 14 is closed fluid may be prevented from traversing portions of the main conduit 11 and optionally directed to or through the bypass conduit 21. When the outlet isolation valve 14 is open fluid may be enabled to traverse the main conduit 11 through the outlet isolation valve 14.

In some embodiments, a pressure gauge shutoff valve 20 may be positioned between a bypass inlet 22 and an inlet coupling 33. When the pressure gauge shutoff valve 20 is closed fluid may be prevented from traversing to a pressure gauge 18 and/or a pressure sensor 15. When the pressure gauge shutoff valve 20 is open fluid may be enabled to traverse to the pressure gauge 18 and/or a pressure sensor 15.

In some embodiments, a bypass valve 24 may be positioned on the bypass conduit 21 between a bypass inlet 22 and a bypass outlet 23. When the bypass valve 24 is closed fluid may be prevented from traversing through portions of the bypass conduit 21 and optionally directed to or through the main conduit 11. When the bypass valve 24 is open fluid may be enabled to traverse bypass conduit 21.

In some embodiments, the system 100 may be configured to automatically monitor water flow, pressure and temperature, which may be used for detecting, preventing and eliminating leaks in the water supply infrastructure of the facility which is in fluid communication with the system 100 and the supply conduit 200. In further embodiments, the system 100 provides for an unlimited range of programmable rates of water flows, via one or more flow control valves 13 that can be achieved automatically and remotely for optimal supply in the facility in which the system 100 is installed.

In some embodiments, the system 100 may comprise a fluid inlet 31 which may be coupled to the supply conduit 200 via an inlet coupling 33. The fluid inlet 31 may connect to the main conduit 11 and the bypass conduit 21 which may be arranged in parallel. The main conduit 11 may comprise one or more devices for the manual regulation of the water flow through the main conduit 11, such as a inlet isolation valve 12 and an outlet isolation valve 14, which may be arranged in series on the main conduit 11. The main conduit 11 may also comprise one or more devices for the automatic regulation of the water flow through the main conduit 11, such as a flow control valve 13, which may be arranged in series on the main conduit 11 between the inlet isolation valve 12 and outlet isolation valve 14.

The bypass conduit 21 may provide a parallel flow path in case of failure of the main conduit 11. The main conduit 11 and bypass conduit 21 may both be coupled to a bypass outlet 23 and the bypass outlet 23 may also be coupled to the supply conduit 200 via an outlet coupling 34. The processing unit 50 may be in wired or wireless electronic communication 41 with a flow control valve 13, a pressure sensor 15, a flow meter 16, and a temperature sensor 17 which may be positioned on the main conduit 11. The processing unit 50 may be self configurable, self adjustable, and user 300 programmable and may use information provided by the flow control valve 13, pressure sensor 15, flow meter 16, and/or temperature sensor 17 to monitor, regulate and shut-off the water flow of the main conduit 21.

Figure 4:
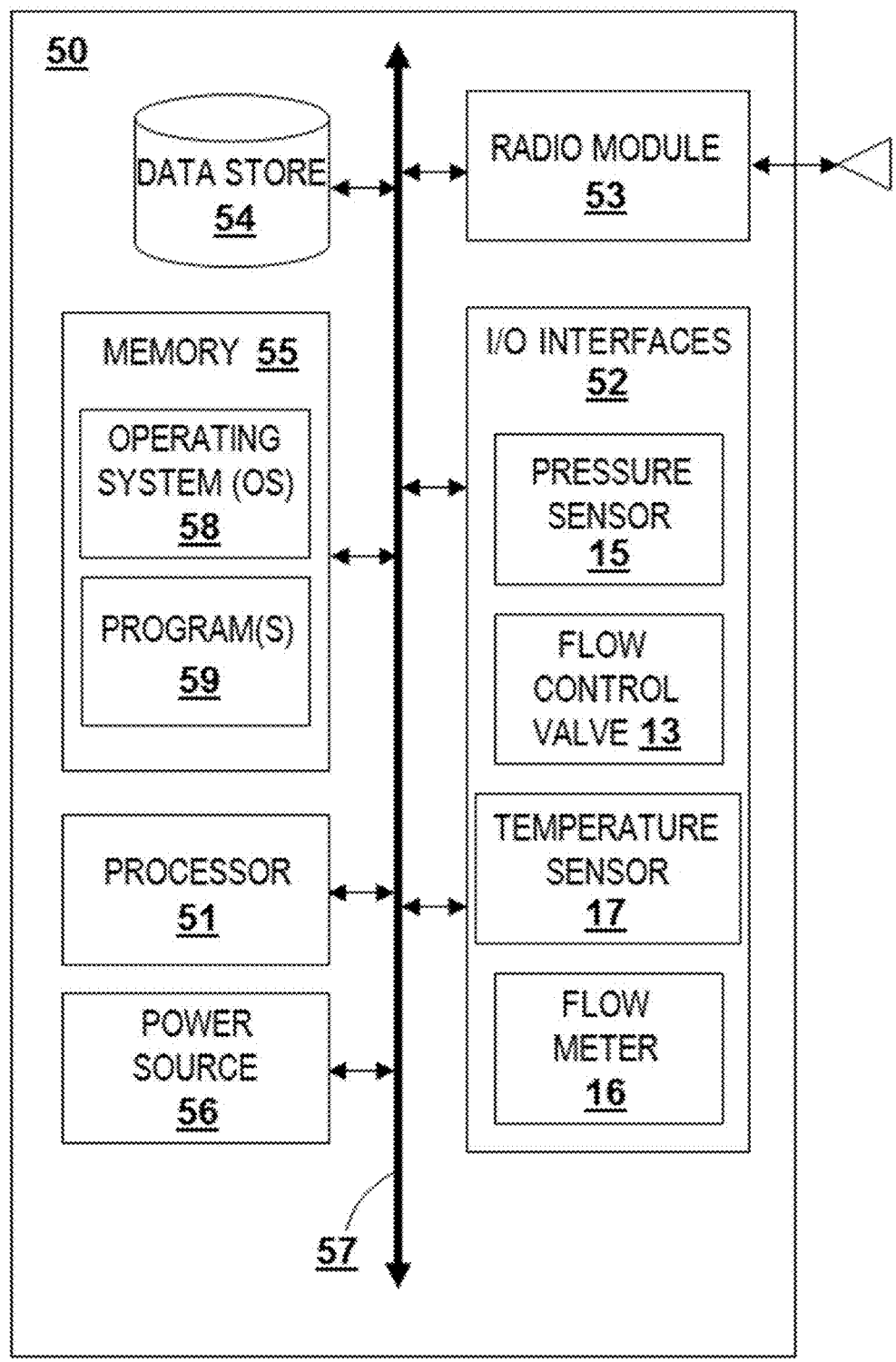
FIG. 4 depicts a block diagram of an example of a processing unit according to various embodiments described herein.

FIG. 4 depicts a block diagram of an example of a processing unit 50 according to various embodiments described herein. In some embodiments and in the present example, the processing unit 50 can be a digital device that, in terms of hardware architecture, optionally comprises a processor 51, a radio module 53, a data store 54, memory 55, power source 56, and/or input/output (I/O) interfaces 52, such as a pressure sensor 15, a flow control valve 13, a temperature sensor 17, and a flow meter 16. It should be appreciated by those of ordinary skill in the art that FIG. 4 depicts an example of the processing unit in an oversimplified manner, and a practical embodiment may include additional components or elements and suitably configured processing logic to support known or conventional operating features that are not described in detail herein.

The components and elements (51, 52, 15, 13, 17, 53, 54, 55, 56) may be communicatively coupled via a local interface 57, wired electronic communication 41 (FIGS. 2 and 3), and/or wireless electronic communication 42 (FIG. 1). The local interface 57 can be, for example but not limited to, one or more buses or other wired or wireless connections, as is known in the art. The local interface 57 can have additional elements, which are omitted for simplicity, such as controllers, buffers (caches), drivers, repeaters, and receivers, among many others, to enable communications. Further, the local interface 57 may include address, control, and/or data connections to enable appropriate communications among the aforementioned components.

In some embodiments, a local interface 57 may be an integrated circuit (IC) that integrates one or more components (51, 52, 15, 13, 17, 53, 54, 55, 56) on a single chip sometimes called a system on a chip (SoC) or system on chip (SOC). In further preferred embodiments, a local interface 57 and one or more components (51, 52, 15, 13, 17, 53, 54, 55, 56) may be a microcontroller (or MCU, short for microcontroller unit) which may be a small computer (SoC) on a single integrated circuit containing a processor 51, memory 55, and programmable input/output interfaces 52 or peripherals. Program memory in the form of Ferroelectric RAM, NOR flash or OTP ROM is also often included on chip, as well as a typically small amount of RAM. Microcontrollers are designed for embedded applications, in contrast to the microprocessors used in personal computers or other general purpose applications consisting of various discrete chips. Microcontrollers are used in automatically controlled products and devices, such as automobile engine control systems, implantable medical devices, remote controls, office machines, appliances, power tools, toys and other embedded systems. By reducing the size and cost compared to a design that uses a separate microprocessor, memory, and input/output devices, microcontrollers make it economical to digitally control even more devices and processes. Mixed signal microcontrollers are common, integrating analog components needed to control non-digital electronic systems.

In alternative embodiments, a local interface 57 may comprise a printed circuit board (PCB) which mechanically supports and electrically connects electronic components including MCU's using conductive tracks, pads and other features etched from copper sheets laminated onto a non-conductive substrate. PCBs can be single sided (one copper layer), double sided (two copper layers) or multi-layer. Conductors on different layers may be connected with plated-through holes called vias. In further embodiments, a local interface 57 may comprise a printed circuit assembly (PCA), printed circuit board assembly or PCB assembly (PCBA), a circuit card assembly (CCA), or a backplane assembly, or any other suitable electrical connection and communication method including standard wiring and the like.

The processor 51 is a hardware device for executing software instructions. The processor 51 can be any custom made or commercially available processor, a central processing unit (CPU), programmable logical controller, an auxiliary processor among several processors, a semiconductor-based microprocessor (in the form of a microchip or chip set), or generally any device for executing software instructions. When in operation, the processor 51 is configured to execute software stored within the memory 55, to communicate data to and from the memory 55, and to generally control operations of the processing unit 50 pursuant to the software instructions. In an exemplary embodiment, the processor 51 may include a mobile optimized processor such as optimized for power consumption and mobile applications.

The I/O interfaces 52 can be used to input and/or output information. In some embodiments, I/O interfaces 52 may include one or more turnable control knobs, depressible button type switches, a key pad, slide type switches, dip switches, rocker type switches, rotary dial switches, numeric input switches or any other suitable input which a user may interact with to provide input. In further embodiments, I/O interfaces 52 may include one or more light emitting elements or other display device, e.g., a LED (light emitting diodes), a speaker, or any other suitable device for outputting or displaying information. The I/O interfaces 52 can also include, for example, a serial port, a parallel port, a small computer system interface (SCSI), an infrared (IR) interface, a radio frequency (RF) interface, a universal serial bus (USB) interface, and the like.

In some embodiments, the I/O interfaces 52 may include one or more pressure sensors 15, flow control valves 13, temperature sensors 17, and flow meters 16. In further embodiments, the I/O interfaces 52 may comprise one or more wired connections or couplings which may enable wired electronic communication 41 between one or more pressure sensors 15, flow control valves 13, temperature sensors 17, and flow meters 16.

An optional radio module 53 may enable wireless electronic communication 42 to an external access device, network, and/or one or more pressure sensors 15, flow control valves 13, temperature sensors 17, and flow meters 16 through an antenna. The radio module 53 may be integrated with the processing unit 50 or the radio module 53 may be a standalone module that may be in electronic communication with the processing unit 50. A radio module 53 may comprise a wireless communication receiver and optionally a wireless communication transmitter. In some embodiments, a radio module 53 may operate on a cellular band and may communicate with or receive a Subscriber Identity Module (SIM) card or other wireless network identifier. Any number of suitable wireless data communication protocols, techniques, or methodologies can be supported by the radio module 53, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Near-Field Communication (NFC); Frequency Hopping Spread Spectrum; Long Term Evolution (LTE); cellular/wireless/cordless telecommunication protocols (e.g. 3G/4G etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The data store 54 may be used to store data and information including information from one or more pressure sensors 15, flow control valves 13, temperature sensors 17, and flow meters 16. The data store 54 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 54 may incorporate electronic, magnetic, optical, and/or other types of storage media.

In some embodiments, the processing unit 50 and/or the system 100 in general may optionally comprise a power source 56 which may provide electrical power to any component (51, 52, 15, 13, 17, 53, 54, 55, 56) of the system 100 that may require electrical power. In some embodiments, a power source 56 may comprise a battery, such as a lithium ion battery, nickel cadmium battery, alkaline battery, or any other suitable type of battery, a fuel cell, a capacitor, a super capacitor or any other type of energy storing and/or electricity releasing device. In further embodiments, a power source 56 may comprise a power cord, kinetic or piezo electric battery charging device, and/or inductive charging or wireless power receiver. In alternative embodiments, electrical power may be supplied to any component (51, 52, 15, 13, 17, 53, 54, 55, 56) of the system 100 that may require electrical power through a wired connection to a power source 56. In further embodiments, a power source 56 may be a two-voltage-level power supply that may be configured for providing low-level voltage for digital electronic components and high-level voltage for analog electronic components.

The memory 55 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 55 may incorporate electronic, magnetic, optical, and/or other types of storage media. Note that the memory 55 may have a distributed architecture, where various components are situated remotely from one another, but can be accessed by the processor 51. The software in memory 55 can include one or more software programs, each of which includes an ordered listing of executable instructions for implementing logical functions. In the example of FIG. 4, the software in the memory system 55 may include a suitable operating system (O/S) 58 and programs 59. An operating system 58 essentially controls the execution of input/output interface 52 functions, and provides scheduling, input-output control, file and data management, memory management, and communication control and related services. The operating system 58 may be, for example, LINUX (or another UNIX variant) and any Linux-kernel-based operating systems, Raspbian, Ubuntu, OpenELEC, RISC OS, Arch Linux ARM, OSMC (formerly Raspbmc) and the Kodi open source digital media center, Pidora (Fedora Remix), Puppy Linux, Android (available from Google), Symbian OS, Microsoft Windows CE, Microsoft Windows 7 Mobile, iOS (available from Apple, Inc.), webOS (available from Hewlett Packard), Blackberry OS (Available from Research in Motion), and the like. The programs 59 may include various applications, configured to provide end user functionality.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The processing unit 50 may optionally include a main memory, such as a random access memory (RAM) or other dynamic storage device (e.g., dynamic RAM (DRAM), static RAM (SRAM), and synchronous DRAM (SDRAM)), coupled to the local interface 57 for storing information and instructions, sometimes called "firmware" that is written in codes such as "assembly", "C" and "Basic", to be executed by the processor 51. In addition, the main memory may be used for storing temporary variables or other intermediate information during the execution of instructions by the processor 51. The processing unit 50 may further optionally include a read only memory (ROM) or other static storage device (e.g., programmable ROM (PROM), erasable PROM (EPROM), and electrically erasable PROM (EEPROM)) coupled to the local interface 57 for storing static information and instructions for the processor 51.

In some embodiments, the programs 59 may comprise software for controlling and receiving information from one or more pressure sensors 15, flow control valves 13, temperature sensors 17, and flow meters 16. In further embodiments, the programs 59 may comprise software for sending information to and receiving information from a control device 400. Additionally, the programs 59 may include one or more temperature, pressure, and flow rate thresholds of the I/O interfaces 52, such as pressure sensors 15, flow control valves 13, temperature sensors 17, and flow meters 16, thereby enabling the programs 59 of the processing unit 50, and therefore the system 100, to automatically monitor the temperature, pressure, and the flow rate of the water flow through the system 100.

In some embodiments, the programs 59 of the processing unit 50, and therefore the system 100, may be configured to automatically regulate and/or monitor water flow, water pressure, and temperature. In further embodiments, the programs 59 of the processing unit 50, and therefore the system 100, may be configured to operate as remote automatic programmable logic to enable a user 300 to remotely perform regulation of water flow and pressure, such as during one or more time periods of an hour, day, week, month, etc., and detecting, preventing and eliminating leaks of the water flow via a control device 400.

In preferred embodiments, the processing unit 50 of the system 100 may allow a user 300 to input or output information through a control device 400 having a user interface such as a computer screen and a keyboard or a touch activated screen. Optionally, the user interface may be a website accessible from a remote control device 400 such as a computer, a fire alarm system, a burglar alarm system, a mobile computer, a home management system, a portable electronic device or in-situ radio frequency operable local controller.

In some embodiments, the programs 59 of the processing unit 50, and therefore the system 100, may be software that is self learning in "learn mode" and self adjusting based on the water usage, habits and patterns, of the facility having a supply conduit 200 to which the system 100 is coupled. In some embodiments, the programs 59 of the processing unit 50, and therefore the system 100, may be system may be programmed for a plurality of learning periods. For example, the programs 59 or software may operate in a learning mode time period, such as two weeks, and the processing unit 50 would monitor the usage and characteristics of the water under what is considered by the user as "Normal Conditions". Then, after the learning mode has been completed and deployed, if the water characteristics stray outside of the limits of the Normal Condition a notification can be sent to a control device 400. This added functionality would be helpful in identifying unusual occurrences that would normally go unnoticed.

In further embodiments, the programs 59 or software may include the steps of automatically alerting the user 300 via a control device 400 when either the temperature, the pressure or the flow rate exceeds at least one or more the thresholds which may be entered or selected by a user 300 via a control device 400, 400A, 400B. In preferred embodiments, the alert provided to the user 300 via a control device 400 may include a warning light, a warning sound, a text message, an email, a pager notification, a voicemail, or any other electronic communication means.

In some embodiments, the programs 59 of the processing unit 50, and therefore the system 100, may be used temporarily as a diagnostic and troubleshooting system for detecting leaks during facility construction and installation. This may be accomplished through programs 59 having capabilities including computerized continuous data acquisition, monitoring and processing of flow, pressure and temperature parameters with algorithms to conserve and optimize.

As can be understood by those skilled in the art, the system 100 can have other devices (wired or wireless) added to the system 100 or in communication with the system 100 at any time to provide added capability and functionality. The system 100 is not to be limited to just the devices and components disclosed herein as the processing unit 50 of the system 100 can detect and integrate a variety of devices and inputs available.

Figure 5:
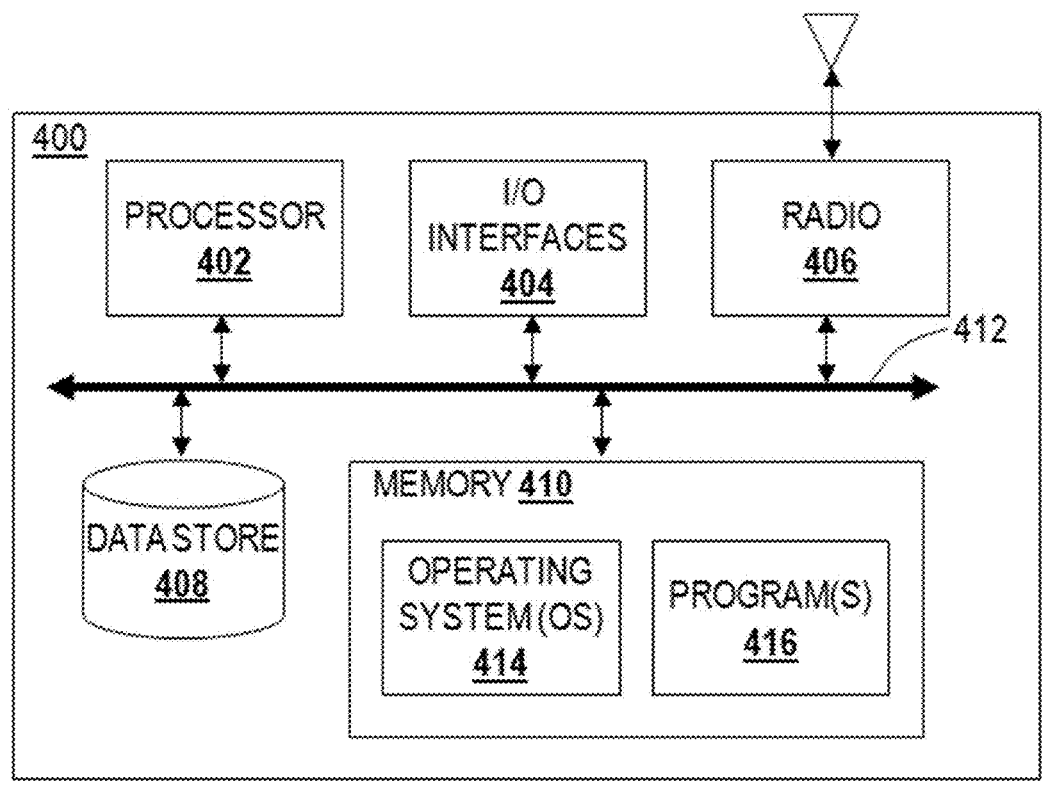
FIG. 5 illustrates a block diagram of an example of a control device according to various embodiments described herein.

FIG. 5 illustrates a block diagram of an example of a control device 400 according to various embodiments described herein. A control device 400 may be a type of computer generally operated by a person or user 300 of the system 100. Generally, a user 300 may use a control device 400 to interact with the processing unit 50 of the system 100, thereby allowing the user 300 to control or receive information from one or more elements of the system 100 such as an ambient temperature sensor 17, a flow control valve 13, any other automated valves, a flow meter 16, and/or a pressure sensor 15.

In some embodiments, a control device 400 may be a mobile control device 400A such as a smartphone or computer configured to receive and transmit data to a server, processing unit 50, or other electronic device which may be operated locally or in the cloud via wireless electronic communication 42. Non-limiting examples of mobile control devices 400A include: personal computers (PCs), workstations, laptops, tablet PCs including the iPad, cell phones including iOS phones made by Apple Inc., Android OS phones, Microsoft OS phones, Blackberry phones, or generally any electronic device capable of running computer software and displaying information to a user. Certain types of mobile control devices 400A which are wearable computers such as Apple Watch, other smartwatches, Fitbit, other wearable fitness trackers, Google Glasses, and the like.

In some embodiments, a control device 400 may be a stationary control device 400B such as a desk top computer or work station, a wall mounted work station, and a console which may typically used in a single location. A stationary control device 400B may be or comprise a computer configured to receive and transmit data to a server, processing unit 50, or other electronic device which may be operated locally or in the cloud via wired electronic communication 41.

Control devices 400, 400A, 400B, can be a digital device that, in terms of hardware architecture, generally includes a processor 402, input/output (I/O) interfaces 404, a radio module 406, a data store 408, and memory 410. It should be appreciated by those of ordinary skill in the art that FIG. 5 depicts a control device 400, 400A, 400B, in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the control device 400, 400A, 400B, a semiconductor-based microprocessor (in the form of a microchip or chip set), or generally any device for executing software instructions. When the control device 400, 400A, 400B, is in operation, the processor 402 is configured to execute software stored within the memory 410, to communicate data to and from the memory 410, and to generally control operations of the control device 400 pursuant to the software instructions. In an exemplary embodiment, the processor 402 may include a mobile optimized processor such as optimized for power consumption and mobile applications.

The I/O interfaces 404 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the processing unit 50 (FIG. 4) via the control device 400, 400A, 400B. Additionally, the I/O interfaces 404 may further include an imaging device, i.e. camera, video camera, etc.

The radio module 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 5, the software in the memory 410 includes a suitable operating system (O/S) 414 and programs 416.

The operating system 414 essentially controls the execution of other computer programs, and provides scheduling, input-output control, file and data management, memory management, and communication control and related services. The programs 416 may include various applications, add-ons, etc. configured to provide end user functionality with the control device 400, 400A, 400B, and the processing unit 50. For example, exemplary programs 416 may include, but not limited to, a web browser, social networking applications, streaming media applications, games, mapping and location applications, electronic mail applications, financial applications, and the like. In a typical example, the end user typically uses one or more of the programs 416 to communicate with the processing unit 50 of the system 100 to accomplish one or more functions of the processing unit 50 described above, such as to enter or manipulate one or more temperature, pressure, and flow rate thresholds of the I/O interfaces 52, such as pressure sensors 15, flow control valves 13, temperature sensors 17, and flow meters 16, thereby enabling the programs 59 of the processing unit 50, and therefore the system 100, to automatically monitor the temperature, pressure, and the flow rate of the water flow through the system 100.

While some materials have been provided, in other embodiments, the elements that comprise the system 100 such as the main conduit 11, bypass conduit 21, one or more optional control units 400, 400A, 400B, and/or any other element discussed herein may be made from durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the system 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the system 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, slide-to-lock type connection method or any other suitable temporary connection method as one reasonably skilled in the art could envision to serve the same function. In further embodiments, one or more of the elements that comprise the system 100 may be coupled by being one of connected to and integrally formed with another element of the system 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A water conservation system, the system comprising:
   a main conduit in fluid communication with a supply conduit via a fluid inlet and a fluid outlet;
   a bypass conduit in fluid communication with the main conduit via a bypass inlet and a bypass outlet;
   an inlet isolation valve, a flow control valve, and an outlet isolation valve coupled in series on the main conduit between the bypass inlet and a bypass outlet
   a bypass valve coupled to the bypass conduit
   a pressure sensor coupled to the main conduit upstream of the bypass conduit inlet and configured to measure water pressure;
   a flow meter configured to measure a water flow rate, the flow meter coupled to the main conduit and located downstream of the bypass conduit outlet and located downstream of the flow control valve thereby configured to measure water flow rates from water traveling through either the bypass conductor the flow control valve;
   an ambient air temperature sensor configured to measure an ambient air temperature outside of the main conduit;
   a processor in electronic communication with the flow control valve, the pressure sensor, ambient air temperate sensor, and the flow meter; and
   a program operating on the processor, the program configured to variably adjust the flow control valve when at least one of the; ambient temperature, the water pressure, and the water flow rate exceeds a threshold.

2. The system of claim 1, wherein the inlet isolation valve is relatively closer to the fluid inlet and the outlet isolation valve relatively closer to the fluid outlet.

3. The system of claim 1, wherein water is able to bypass portions of the main conduit having the inlet isolation valve, flow control valve, and outlet isolation valve via the bypass conduit when the bypass valve is open.

4. The system of claim 1, further comprising a fluid modification provision selected from one of; a water filter, a water softener, a water sanitizer, a water heater, a water cooler, and a salt dispenser.

5. The system of claim 1, wherein the flow control valve is operable by the processor.

6. The system of claim 5, wherein processor controls the water pressure in the main conduit by operating the flow control valve.

7. The system of claim 6, further comprising a smartphone in electronic communication with the processing unit, and wherein the smartphone is used to operate the flow control valve.

8. A water conservation system, the system comprising:
a main conduit in fluid communication with a supply conduit via a fluid inlet and a fluid outlet;
a bypass conduit in fluid communication with the main conduit via a bypass inlet and a bypass outlet;
an inlet isolation valve, a flow control valve, and an outlet isolation valve coupled in series on the main conduit between the bypass inlet and a bypass outlet;
a bypass valve coupled to the bypass conduit;
a pressure sensor coupled to the main conduit before the bypass conduit inlet;
a flow meter coupled to the main conduit after the bypass conduit outlet and located downstream of the flow control valve thereby configured to measure water flow rates from water traveling through either the bypass conduit or the flow control valve;
an ambient air temperature sensor configured to measure an ambient air temperature outside of the main conduit;
a processor in electronic communication with the flow control valve, the pressure sensor, the ambient air temperature sensor, and the flow meter; and
a smartphone in electronic communication with the processor.

9. The system of claim 8, wherein the inlet isolation valve is relatively closer to the fluid inlet and the outlet isolation valve relatively closer to the fluid outlet.

10. The system of claim 8, wherein fluid is able to bypass portions of the main conduit having the inlet isolation valve, flow control valve, and outlet isolation valve via the bypass conduit when the bypass valve is open.

11. The system of claim 8, further comprising a fluid modification provision selected from one of; a water filter, a water softener, a water sanitizer, a water heater, a water cooler, and a salt dispenser.

12. The system of claim 8, wherein the flow control valve is operable by the processor.

13. The system of claim 12, wherein the processor controls the water pressure in the main conduit by operating the flow control valve.

14. The system of claim 13, wherein the smartphone is used to operate the flow control valve through communicating with the processor.

* * * * *